Nov. 3, 1964    A. HARMENS    3,154,928
GASIFICATION OF A LIQUID GAS WITH SIMULTANEOUS
PRODUCTION OF MECHANICAL ENERGY
Filed March 6, 1963

Inventor
ALEXANDER HARMENS

By
Ooms, McDougall & Hersh
Attorneys

United States Patent Office 3,154,928
Patented Nov. 3, 1964

3,154,928
GASIFICATION OF A LIQUID GAS WITH SIMULTANEOUS PRODUCTION OF MECHANICAL ENERGY
Alexander Harmens, Purley, Surrey, England, assignor to Conch International Methane Limited, Nassau, Bahamas, a Bahamian company
Filed Mar. 6, 1963, Ser. No. 263,187
Claims priority, application Great Britain Apr. 24, 1962
5 Claims. (Cl. 62—53)

This invention relates to a method of gasifying a liquefied gas in such a way that gas at a desired delivery pressure is formed and mechanical energy is produced.

It is known to gasify a liquefied gas by raising the pressure of the liquefied gas to a pressure substantially higher than the desired delivery pressure, heating the pressurized liquefied gas so that it evaporates, expanding the gas formed to the desired delivery pressure in an expansion machine so that mechanical energy is produced, and delivering the expanded gas.

The present invention relates to an improved method of the above kind which has the advantage that more mechanical energy can be produced per unit mass of liquefied gas which is evaporated.

Therefore the method according to the invention comprises the steps of raising the pressure of the liquefied gas to a pressure substantially higher than the desired delivery pressure, passing the pressurized liquefied gas in heat exchange with a first heating fluid and thereafter with a second heating fluid so that the pressurized liquefied gas is converted into high pressure gas, expanding the high pressure gas to the desired delivery pressure in an expansion machine so that mechanical energy is produced, delivering a part of said expanded gas, passing a part of said expanded gas to a second expansion machine and expanding it further to a relatively low pressure, so that mechanical energy is produced using this expanded gas of a relatively low pressure as the said first heating fluid so that it condenses, raising the pressure of the condensate formed to the pressure of the pressurized liquefied gas and adding said pressurized condensate to the pressurized liquefied gas.

The method according to the invention is in particular destined for the gasification of liquid methane, liquefied natural gas, liquid ethane or liquid propane although the invention is not limited thereto. It can for example also be used for the gasification of liquid air, liquid nitrogen, liquid oxygen or other liquefied gases.

Liquid methane and liquefied natural gas are shipped in bulk at about atmospheric pressure in specially designed tankers from producing areas to consuming areas. The temperature of saturated liquid methane at about atmospheric pressure is as low as minus 161 degrees centigrade. The temperature of saturated liquefied natural gas at about atmospheric pressure is of the same order of magnitude as of liquid methane, depending on its composition. When the liquid methane or the liquefied natural gas arrives in the consuming country it has to be gasified, and in order to enable its transport through pipelines when in gaseous condition its pressure has to be raised.

During the gasification of the liquefied natural gas or of the liquid methane large quantities of cold will be liberated. For economic reasons it is highly desirable not to waste this cold. It can for example be used for liquefying air for the production of liquid oxygen and of liquid nitrogen. Since a market for liquid oxygen or for liquid nitrogen is not always available in the consuming country the only possible way of making profitable use of the large quantities of cold liberated is often to use it for the production of mechanical energy in an inexpensive way.

The invention deals with a method of obtaining a relatively large amount of mechanical energy from the gasification of liquefied gas, while raising the pressure of the gas to a suitable pressure for transport of the gas through pipelines present in the consuming country.

The invention will now be described with reference to the drawings in which.

Figure 1:
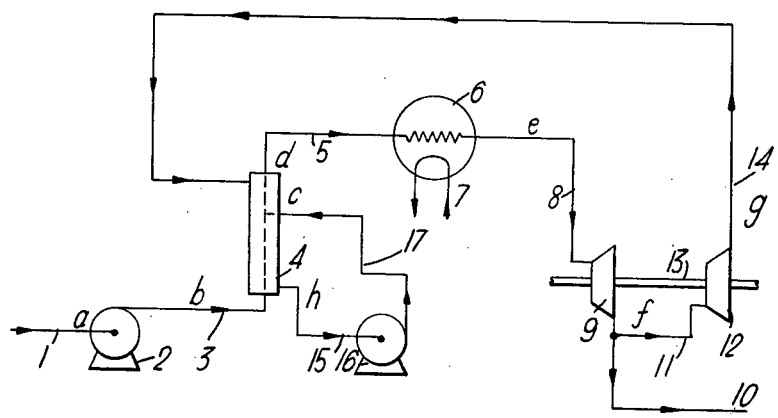
FIGURE 1 shows a diagrammatic arrangement of the apparatus used for the method according to the invention.
Figure 2:
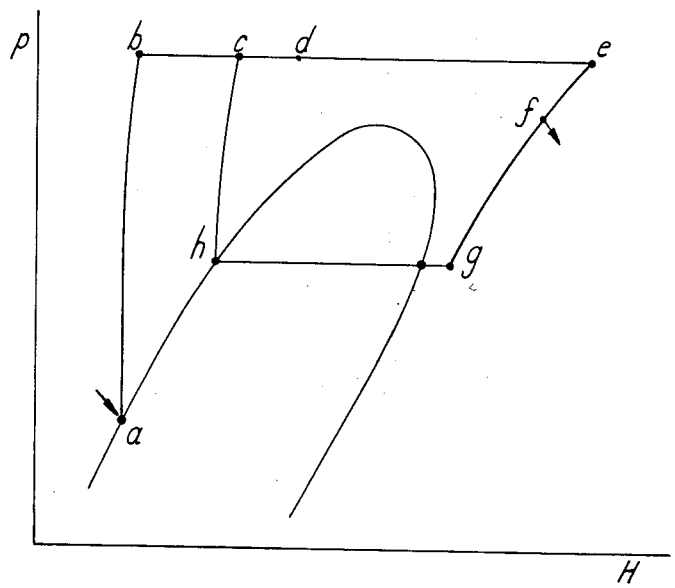
FIGURE 2 illustrates the method according to the invention in a schematic pressure-enthalpy diagram in which the pressure P is plotted to a logarithmic scale on the vertical axis and the enthalpy H is plotted on the horizontal axis.

The liquefied gas which is to be gasified is supplied through a line 1 to a pump 2. The liquefied gas in line 1 is in the condition indicated in the pressure-enthalpy diagram by $a$. Normally the liquefied gas in line 1 is at a pressure of about 1 atmosphere, although it is also possible to supply the liquefied gas at a somewhat higher pressure for example at 3 atmospheres. In pump 2 the pressure of the liquefied gas is raised to a pressure substantially higher than the desired delivery pressure of the gas. The condition of the liquefied gas after passing pump 2 is indicated in the pressure-enthalpy diagram by $b$. From pump 2 the liquefied gas is passed through line 3 to heat-exchanger 4. In heat exchanger 4 heat is added to the liquefied gas by passing it in heat exchange relationship with a first heating fluid which will be described later. In heat exchanger 4 the condition is changed from $b$ to $c$ to $d$ (see pressure-enthalpy diagram). From heat exchanger 4 the liquefied gas, the mixture of the liquefied gas and gas, or the gas is passed through line 5 to heat-exchanger 6 in which again heat is added by means of a second heating fluid which will be described later. In heat exchanger 6 the condition is changed from $d$ to $e$ (see pressure-enthalpy diagram).

After passing heat exchanger 6 only gas is present and this gas is passed through line 8 to an expansion turbine 9 or a similar expansion device.

In turbine 9 the gas is expanded to the desired delivery pressure of the gas, mechanical energy being produced. The condition of the gas after passing the turbine 9 is indicated by $f$. Part of the gas which is at the desired delivery pressure is passed through line 10 and is delivered for example to a pipeline which is destined for transporting the gas to the consumer.

The remaining part of the gas at delivery pressure is passed through a line 11 to a second expansion turbine 12 or a similar expansion device. In the turbine 12 the gas is further expanded to a relatively low pressure, mechanical energy being produced. The condition of the gas after expansion in turbine 12 is indicated in the pressure-enthalpy diagram by $g$. From turbine 12 the gas passes through line 14 to heat-exchanger 4. In heat-exchanger 4 the gas is used as the above mentioned first heating fluid and heat will be transferred from it to the liquefied gas which is to be vaporized. As a result of the cooling of the gas when passing the heat-exchanger 4 it will condense and reach condition $h$. The condensate formed will pass from heat exchanger 4 through line 15 to pump 16. In pump 16 the pressure of the condensate will be raised to the pressure of the liquefied gas leaving pump 2. The pressurized condensate leaving pump 16 will be in condition $c$. The condensate in condition $c$ is passed from pump 16 through line 17 and it is added to the liquefied gas which is to be vaporized at a point in the heat-exchanger 4 where the liquefied gas to be vaporized is also in condition $c$.

In the heat-exchanger 6 the said second heating fluid is passed through a line 7 and heat is transferred from it to the liquefied gas which is to be vaporized. This second heating fluid can be sea or river water, ambient air, steam, brine or any other suitable heating fluid. If brine is used the brine leaving the heat-exchanger 6 can be used for refrigerating purposes. It can for example be used for the cooling of storage rooms or for freezing foodstuffs. Then it can be passed back to the heat-exchanger 6 to be cooled down again. If desired the gas in line 11 can be passed through a further heat exchanger to be further heated before entering the second turbine 12. The turbines 9 and 12 can be mechanically connected, if desired, said connection being schematically indicated by numeral 13.

Although the method according to the invention is mainly destined for the gasification of liquefied methane, natural gas, ethane or propane it can of course also be used for the gasification of other liquefied gases.

In the following a numerical example of the gasification of liquid methane will be given.

The liquid methane is supplied at a pressure of 1 ata. (atmosphere absolute) and at a temperature of minus 161 degrees centigrade. In pump 2 the pressure of the liquid methane is raised to 100 ata. and then it is passed through heat exchanger 4. About halfway in the heat exchanger 4 liquid methane having the same temperature and pressure as the liquid methane in the heat exchanger is added. Only liquid methane leaves the heat-exchanger 4 after having taken up heat in the heat-exchanger 4. The liquid methane is then further heated and evaporated in heat-exchanger 6, for example against seawater so that gaseous methane at a pressure of 100 ata. and at a temperature of plus 5 degrees centigrade is formed. The methane gas is then expanded in the first turbine 9 to a pressure of 68 ata. and a temperature of minus 20 degrees centigrade. Part of this methane gas of 68 ata. is now removed from the system and delivered to a pipeline leading to the consumers. The quantity of methane gas removed in this way should be as large as the quantity of liquid methane supplied to the system. The remainder of the methane gas of 68 ata. and of minus 20 degrees centigrade is expanded in turbine 12 to a pressure of 25 ata. This expanded methane gas is then passed through heat exchanger 4 and is cooled and condensed. The condensate formed is raised to a pressure of 100 ata. in pump 16 and is added to the stream of liquid methane.

The turbines 9 and 12 produce mechanical energy. If the pump and generator efficiencies are each 75% the net power which can be recovered from 100 ton/hr. of liquid methane is 1.9 m. watt (this is the power produced minus the pumping power).

It will be understood that the above numerical example is not given to limit the scope of the invention to the numerical values mentioned.

I claim:

1. A method of gasifying a liquefied gas to a desired delivery pressure and obtaining mechanical energy which comprises raising the pressure of the liquefied gas to a pressure substantially higher than the desired delivery pressure, passing the pressurized liquefied gas in heat exchange with a first heating fluid and thereafter with a second heating fluid so that the pressurized liquefied gas is converted into high pressure gas, expanding the high pressure gas to the desired delivery pressure in an expansion machine so that mechanical energy is produced, delivering a part of said expanded gas, passing a part of said expanded gas to a second expansion machine and expanding it further to a relatively low pressure so that mechanical energy is produced, using the expanded gas of relatively low pressure as the first heating fluid so that it condenses, raising the pressure of the condensate formed to the pressure of the pressurized liquefied gas and adding said pressurized condensate to the pressurized liquefied gas.

2. A method as claimed in claim 1 in which the pressurized condensate is added to the pressurized liquefied gas whilst it is in heat exchange relationship with a first heating fluid.

3. A method as claimed in claim 1 in which the liquefied gas comprises methane.

4. A method as claimed in claim 1 in which the liquefied gas is supplied at atmospheric pressure.

5. A method as claimed in claim 1 in which the second heating fluid is brine.

References Cited in the file of this patent
UNITED STATES PATENTS

| | | |
|---|---|---|
| 2,467,413 | Wildhack | Apr. 19, 1949 |
| 2,471,476 | Benning et al. | May 31, 1949 |
| 2,937,504 | Reidiger | May 24, 1960 |
| 3,068,659 | Marshall | Dec. 18, 1962 |